(No Model.)  2 Sheets—Sheet 1.
U. & W. R. SNEAD & W. M. BURNS.
SHELF STRUCTURE.
No. 520,191. Patented May 22, 1894.
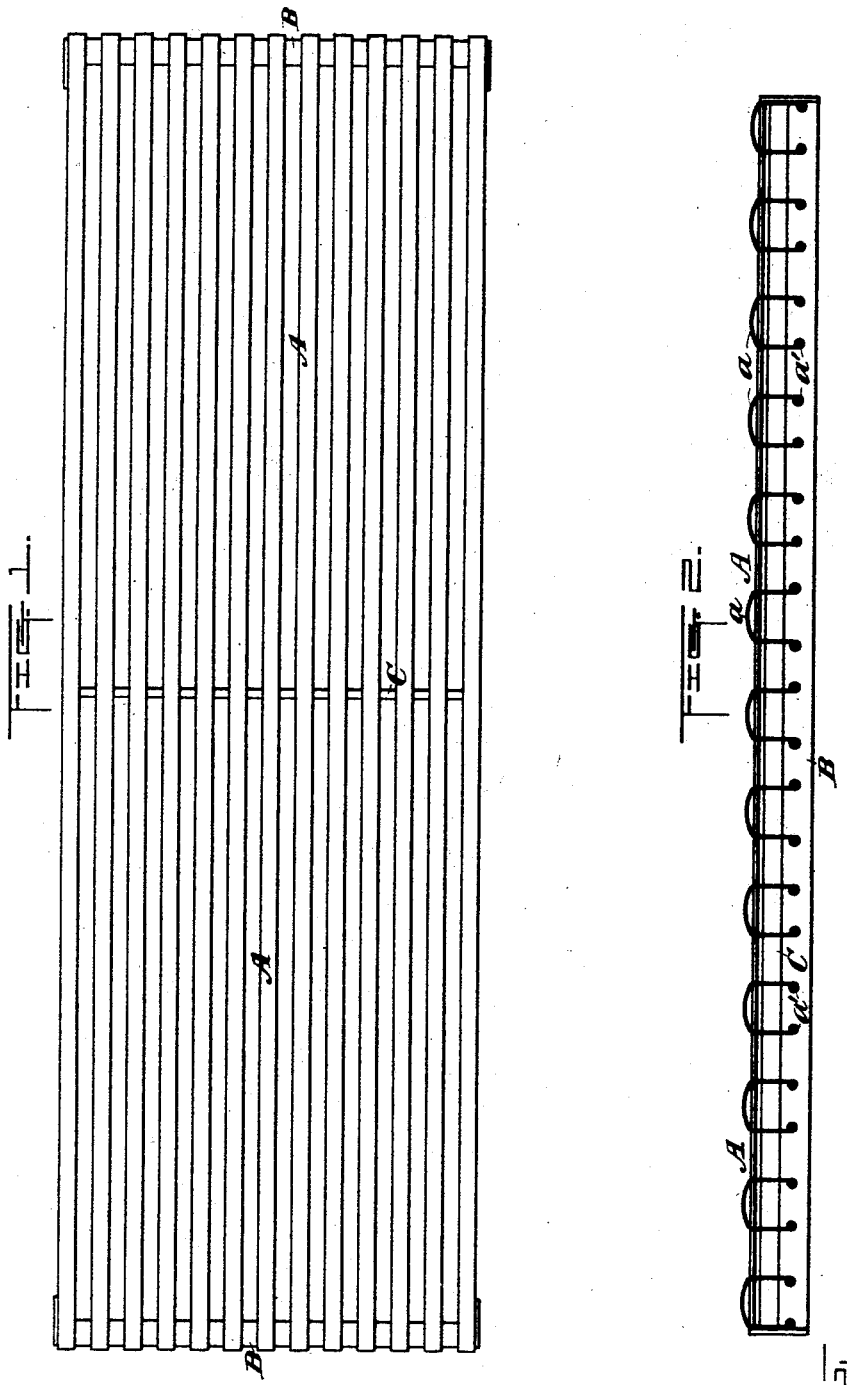

(No Model.) 2 Sheets—Sheet 2.
U. & W. R. SNEAD & W. M. BURNS.
SHELF STRUCTURE.
No. 520,191. Patented May 22, 1894.
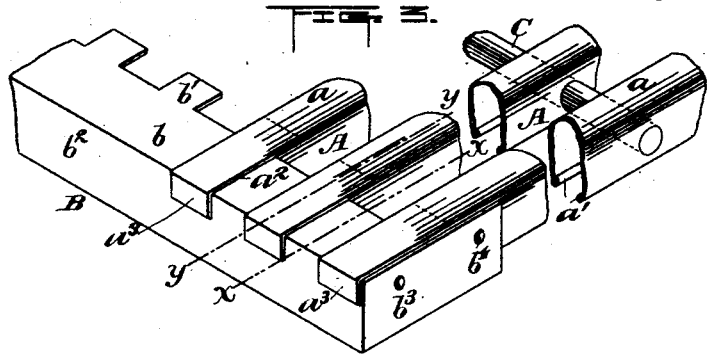
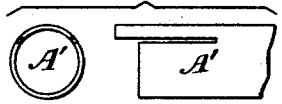 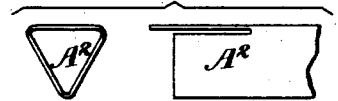 
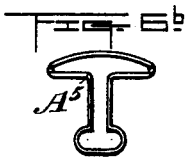 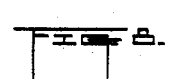
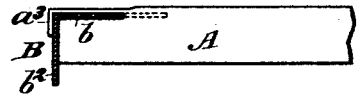
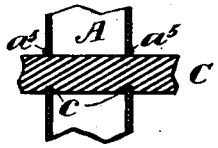 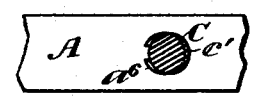
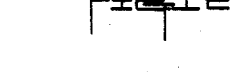  
Witnesses.
George Barry,
Inventors.
Udolpho Snead
William R Snead and
William M Burns
Brown & Seward
by attorneys

UNITED STATES PATENT OFFICE.

UDOLPHO SNEAD, WILLIAM R. SNEAD, AND WILLIAM M. BURNS, OF LOUISVILLE, KENTUCKY, ASSIGNORS TO THE SNEAD & COMPANY IRON WORKS, OF SAME PLACE.

SHELF STRUCTURE.

SPECIFICATION forming part of Letters Patent No. 520,191, dated May 22, 1894.

Application filed November 7, 1893. Serial No. 490,247. (No model.)

*To all whom it may concern:*

Be it known that we, UDOLPHO SNEAD, WILLIAM R. SNEAD, and WILLIAM M. BURNS, of Louisville, in the county of Jefferson and State of Kentucky, have invented a new and useful Improvement in Shelf Structures, of which the following is a specification.

Our invention relates to an improvement in shelf structures with the object in view of providing a shelf structure which shall be light, strong, durable and capable of being manufactured at a low initial cost.

A practical embodiment of our invention is represented in the accompanying drawings, in which—

Figure 1 represents a top plan view of the shelf. Fig. 2 is an enlarged transverse section. Fig. 3 is an enlarged view in perspective of one corner of the shelf, showing the manner of assembling the shelf bars, the end girders and bridge pieces. Figs. 4, 5, 6, $6^a$ and $6^b$ represent some of the forms other than U-shaped, which the shelf bars may assume. Fig. 7 is a vertical section through the corner of the shelf on the line $x, x$ of Fig. 3. Fig. 8 is a similar section on the line $y, y$ of Fig. 3. Figs. 9 and 10 represent end sections transverse to the bridge piece and longitudinal to the bridge piece, showing the manner of locking the bridge piece to the shelf bars, and Figs. 11, 12, 13 and 14 represent other means for locking the bridge piece in the opening therefor when the bridge bars assume other shapes than respectively round and oval, as represented in Figs. 9 and 10.

The shelf bars A in the preferred form, shown in Figs. 1, 2 and 3, have a general U-shape with their tops slightly rounded, as shown at $a$, and with strengthening beads $a'$ on their free edges. The strengthening beads $a'$ may be conveniently rolled on the bars at the time the blanks are formed and when the blank is bent from its flat into its U-shaped form, the beads will be brought at the bottom edges of the shelf bars, as clearly shown in Fig. 2 to give additional strength to them and to resist any tendency of the bars to sag when subjected to the weight of books or any other articles which may be placed thereon. It is obvious that the beads $a'$ might be formed by rolling over the free edges of the shelf blanks, but we do not consider such an arrangement as satisfactory as the solid beads. The end girders to which the ends of the shelf bars are secured are denoted by B and are formed of angle iron, L-shaped in cross section. The ends of the shelf bars are provided with longitudinal slits $a^2$ extending from their extreme ends to a depth equal to the narrowest portion of the flange $b$ of the end girder and of a thickness sufficient to receive said flange with a snug, sliding fit within them. The slits $a^2$ are located in the opposite sides of the shelf bar in close proximity to the edges of the top of the bars and in order to provide for the turning down of the extreme end of the top bar over the angle of the end bar, the sides of the shelf bar are made somewhat shorter than the top of the bar, as clearly shown in Figs. 4 to 8 inclusive. At such distances as desired for spacing the shelf bars apart, the flange $b$ of the end girder is provided with tongues $b'$ projecting therefrom and of such width as to fit snugly within the shelf bar between the opposite sides of the bar.

The shelf bar and end girder are assembled by inserting the flange $b$ of the end girder within the slits $a^2$ in the bar until the ends of the sides of the shelf bar abut against the flange $b^2$ of the end girder, the tongue $b'$ projecting between the sides of the shelf bar beyond the ends of the slits, and then folding down the projecting end $a^3$ of the shelf bar over the angle of the end girder onto the flange $b^2$, as clearly shown in Fig. 3. The projecting tongue $b'$ will prevent lateral displacement of the shelf bar while the turned-down portion $a^3$ will prevent the longitudinal displacement of the same and the slits in which the flange $b$ is inserted will prevent vertical displacement of the bar. The bar will be thus firmly interlocked with the end girder against displacement in any direction.

To form a rigid structure at the corners, we shorten the flange $b$ so that it shall rest flush with the exterior side of the outer shelf bar and then turn the projecting end of the flange $b^2$ over against the end of the flange $b$ and against the side of the shelf bar and rivet it to the bar, as shown at $b^3$ and $b^4$.

The shelf bars may be made to assume numerous other forms than U-shaped in cross section. When made to assume the cylindrical form, as shown at $A'$, Fig. 4; the triangular form, as represented at $A^2$, Fig. 5; the square form, shown at $A^3$, Fig. 6; or the oval or the hollow T-form, shown at $A^4$ and $A^5$, in Figs. 6ª and 6ᵇ respectively; the connection with the end girder may be made in all essential particulars in the same manner as already described in connection with the U-shaped form.

When the shelf bars are of such length as to be liable to vibrate or become distorted under pressure, they may be stiffened and held in position by one or more bridge bars C, as follows:—As represented in Figs. 9 and 10, the bridge bar C is round and the openings $a^4$ through the sides of the shelf bars for the reception of the rod C are made slightly oval. The bar C is provided at intervals corresponding to the positions of the sides of the shelf bars with shallow recesses $c$ of such width as to receive the sides of the shelf bar and when the bridge bar is inserted in position, it is forced toward one end of the oval opening $a^4$ so as to bring the side of the shelf bar into the recess $c$ and the bridge bar C is locked in such position by means of a small lug $a^5$ which is conveniently left at the margin of the opening $a^4$ at the time the latter is cut, the said lug—after the bridge bar is forced into engagement with the side of the shelf bar—being turned down into contact with the bridge bar, as clearly indicated in Fig. 9.

Instead of making the opening for the bridge bar C oval, it may be made round and about the size of the bar, as shown at $a^6$, Fig. 11, and the bar C may be provided with an annular recess $c'$ so as to permit it to be forced laterally to engage the side of the shelf bar. The bridge bar may also be made polygonal in cross section instead of round, the square form of said bar being represented by $C'$ in Figs. 12, 13 and 14. It may be held in position by forcing lips $a^7$, formed from the side of the bar A, into close frictional contact with the side of the square bar, thereby forcing the sides of the shelf bar into recesses in the bridge bar, as clearly shown in Figs. 12 and 13, or the square bar $C'$ may have slits $c^2$ at its corners, as shown in Fig. 14 and after passing the bar through the square hole corresponding thereto, it may be turned, as shown in Fig. 14, to bring the walls of the square hole into the slits at the corners of the bar.

The structure hereinabove described is such as to admit of forming the shelf bars and their girders of tough malleable metal, such for example as rolled steel, and hence renders it feasible to make them very light and at the same time sufficiently strong to sustain the weight required of them. It also admits of performing the necessary shaping and assembling by machinery, and hence makes the cost of manufacture low.

It is obvious that other slight changes might be resorted to in the form and arrangement of the several parts without departing from the spirit and scope of our invention, hence we do not wish to limit ourselves strictly to the structure and arrangement herein set forth, but

What we claim is—

1. The shelf structure, comprising a series of hollow bars having their ends slit, and flanged end girders, arranged to enter the slits in the hollow bars, substantially as set forth.

2. The shelf structure, comprising a series of hollow bars having their ends slit, and flanged end girders, one of the flanges of the end girder being provided with projecting tongues, the flanges being arranged to enter the slits in the bars and the tongues to enter the interiors of the bars beyond the flange, substantially as set forth.

3. The shelf structure, comprising a series of hollow bars having their ends slit and their top sides projected beyond the sides, and flanged girders adapted to enter the slits in the ends of the bars to a point where the projecting top sides may be turned down over the edge of the girder, substantially as set forth.

4. The shelf structure, comprising a series of hollow bars having their ends slit, L-shaped end girders having their upright flanges extended and their horizontal flanges adapted to enter the slit ends of the bars, the projected flanges of the end girders being adapted to fold over against the side of the edge bar at the end of the horizontal flange, substantially as set forth.

5. The shelf structure, comprising a series of hollow bars connected at their ends, and a bridge bar extending transversely through the sides of the hollow bars, the sides of the bars and the bridge bar being provided the one with a recess and the other with a lip or lug for locking the hollow bars to the bridge bar against lateral displacement, substantially as set forth.

6. The shelf structure, comprising a series of hollow bars connected at their ends, and a bridge bar extending transversely through the sides of the hollow bars, the openings for the bridge bar being enlarged to afford the bar a limited lateral movement therein, the shelf bars being provided with lips or lugs at the margin of the bridge bar openings for locking the bridge bar in engagement with the hollow bars, substantially as set forth.

UDOLPHO SNEAD.
WILLIAM R. SNEAD.
WM. M. BURNS.

Witnesses:
E. C. SEWARD,
W. W. CRAWFORD.